US012098936B2

(12) United States Patent
Labeye et al.

(10) Patent No.: US 12,098,936 B2
(45) Date of Patent: Sep. 24, 2024

(54) DEVICE FOR DISTRIBUTING A SIGNAL FOR MEASURING WAVELENGTH SHIFTS

(71) Applicants: COMMISSARIAT A L'ENERGIE ATOMIQUE ET AUX ENERGIES ALTERNATIVES, Paris (FR); SAFRAN, Paris (FR)

(72) Inventors: Pierre Labeye, Grenoble (FR); Guillaume Laffont, Grenoble (FR)

(73) Assignees: COMMISSARIAT A L'ENERGIE ATOMIQUE ET AUX ENERGIES ALTERNATIVES, Paris (FR); SAFRAN, Paris (FR)

( * ) Notice: Subject to any disclaimer, the term of this patent is extended or adjusted under 35 U.S.C. 154(b) by 70 days.

(21) Appl. No.: 17/609,133

(22) PCT Filed: May 6, 2020

(86) PCT No.: PCT/FR2020/050755
§ 371 (c)(1),
(2) Date: Nov. 5, 2021

(87) PCT Pub. No.: WO2020/225513
PCT Pub. Date: Nov. 12, 2020

(65) Prior Publication Data
US 2022/0221313 A1 Jul. 14, 2022

(30) Foreign Application Priority Data
May 7, 2019 (FR) ...................................... 1904783

(51) Int. Cl.
*G01D 5/353* (2006.01)
*G02B 6/12* (2006.01)
(52) U.S. Cl.
CPC ..... *G01D 5/35316* (2013.01); *G02B 6/12016* (2013.01); *G02B 6/12019* (2013.01)

(58) Field of Classification Search
CPC .. G02B 6/12016; G02B 6/12019; G02B 6/12; G01D 5/353; G01D 5/35316
See application file for complete search history.

(56) References Cited

U.S. PATENT DOCUMENTS 6,374,013 B1 * 4/2002 Whiteaway ........ G02B 6/12033
385/27
10,247,880 B2 * 4/2019 Docter ................. G01B 11/168
(Continued)

FOREIGN PATENT DOCUMENTS

| CN | 104918145 B | 10/2018 |
|---|---|---|
| EP | 1 447 693 A1 | 8/2004 |

OTHER PUBLICATIONS

International Search Report issued on Oct. 2, 2020 in PCT/FR2020/050755 filed on May 6, 2020, 2 pages.
(Continued)

*Primary Examiner* — Tina M Wong
(74) *Attorney, Agent, or Firm* — Oblon, McClelland, Maier & Neustadt, L.L.P.

(57) ABSTRACT

A signal-distributing device that includes an arrayed-waveguide-grating demultiplexer and at least one receiving module. Each receiving module includes a multimode interference coupler and two output waveguides, the multimode interference coupler being located between the arrayed-waveguide-grating demultiplexer and the two output waveguides. The multimode interference coupler is configured to distribute, to the two output waveguides, an optical signal delivered by the arrayed-waveguide-grating demultiplexer. Such a device allows wavelength shifts in the signal delivered by a set of one or more sensors, in particular Bragg grating reflectors inscribed in a given optical fibre, to be measured. It allows a wavelength shift to be measured with a high linearity and a signal-to-noise ratio.

15 Claims, 5 Drawing Sheets

(56) References Cited

U.S. PATENT DOCUMENTS

2007/0071388 A1    3/2007   Lu
2008/0089646 A1    4/2008   Lu
2011/0088631 A1    4/2011   Hsieh et al.
2017/0227713 A1    8/2017   Okayama

OTHER PUBLICATIONS

French Preliminary Search Report (with English translation of Categories of Cited Documents) issued on Dec. 6, 2019 in French Application 1904783 filed on May 7, 2019, 2 pages.

Niewczas, P. et al., "Performance Analysis of the Fiber Bragg Grating Interrogation System Based on an Arrayed Waveguide Grating," IEEE Transactions on Instrumentation and Measurement, vol. 53, No. 4, 2004, pp. 1192-1196, XP001221388.

* cited by examiner

DEVICE FOR DISTRIBUTING A SIGNAL FOR MEASURING WAVELENGTH SHIFTS

TECHNICAL FIELD

The invention relates to the field of wavelength offset measurement, in particular for analysing a light signal originating from one or more sensors capable of translating a value of a parameter to be measured into a wavelength shift value on an output signal. Such a light signal can originate, in particular, from an optical fibre within which reflectors of the Bragg grating type are inscribed.

PRIOR ART

In the prior art, optical fibres are known inside which reflectors of the Bragg grating type are inscribed, each reflecting light at a respective wavelength. Such optical fibres are, for example, integrated into a mechanical structure in order to monitor its integrity. The appearance of a local defect in said structure is then translated by a shift in the reflection wavelength of one or more of the reflectors. The detection and measurement of the wavelength shift allows the defect to be detected and quantified. Since the various reflectors of a given fibre each reflect a different wavelength, it is also possible to locate the defect along the optical fibre.

In order to be able to simultaneously detect the respective responses of the reflectors inscribed in the same optical fibre, it is known to send a broad-spectrum light signal to the input of the fibre, covering the reflection wavelengths of these various reflectors. The return signal reflected by the fibre then combines the responses of each of said reflectors. In order to discriminate the contributions of the different reflectors, it is known to use an arrayed-waveguide-grating demultiplexer (generally designated by the acronym "AWG"). An AWG can spatially separate the different spectral contributions of an input light beam, in this case the return signal reflected by the fibre, using an arrayed waveguide grating disposed between two planar guide elements. The spectral contributions of the return signal reflected by the fibre are thus distributed at the output of the AWG, at positions which depend on their wavelength. Output waveguides are arranged at different determined positions at the output of the AWG, in order to each receive a signal at a determined wavelength. These output waveguides each form a respective output channel of the AWG. They are each connected to a photodetector at their end opposite the AWG. Such an assembly is described, for example, by P. Niewczas & al., in the article *"Performance Analysis of the Fiber Bragg Grating Interrogation System Based on an Arrayed Waveguide Grating"*, IEEE Transactions on Instrumentation and Measurement, Volume 53, No. 4, August 2004, pp 1192-1196. For each of the reflectors i inscribed in the optical fibre, a way of measuring a low amplitude wavelength shift consists in measuring a signal over two output channels of the AWG, associated with two neighbouring wavelengths framing the nominal wavelength of the reflector (reflection wavelength of the reflector at rest, in other words in the absence of external disturbance). These two output channels are denoted $A_1$ and $B_1$. The measurement $M_1$ of a shift in the reflection wavelength of the reflector i is then given by:

$$M_i = \frac{(\alpha_i - \beta_i)}{(\alpha_i + \beta_i)} \quad (1)$$

where $\alpha_i$ is the signal measured on channel $A_i$, and $\beta_i$ is the signal measured on channel $B_i$.

An object of the invention is to provide a signal-distributing device for measuring at least one wavelength shift, with an improved signal-to-noise ratio relative to the signal-to-noise ratio obtained for such a measurement in the devices of the prior art.

Presentation of the Invention

This object is achieved with a signal-distributing device, designed to measure at least one wavelength shift, and which comprises an arrayed-waveguide-grating demultiplexer configured to spatially separate the spectral contributions of an input optical signal.

According to the invention, the signal-distributing device further comprises at least one receiving module. Each receiving module comprises a multimode interference coupler and two output waveguides, the multimode interference coupler being located between the arrayed-waveguide-grating demultiplexer and the two output waveguides. The multimode interference coupler is configured to distribute, to said two output waveguides, an optical signal originating from the arrayed-waveguide-grating demultiplexer. Advantageously, the multimode interference coupler is directly attached against the arrayed-waveguide-grating demultiplexer or separated therefrom by a taper type adapter.

The multimode interference coupler is a coupler with one input channel and two output channels, with its input channel on the side with the arrayed-waveguide-grating demultiplexer and its two output channels on the side with the two corresponding output waveguides. It is configured to receive as input a part of the wavelength-demultiplexed optical signal supplied by the arrayed-waveguide-grating demultiplexer.

The device according to the invention is configured to receive as input an input optical signal supplied by a set of one or more sensors, wherein each sensor is capable of translating a value of a parameter to be measured into a wavelength shift value on an output signal. The distribution device can carry out simultaneous measurement of the wavelength shifts associated with each of the sensors of this set.

Figure 1:
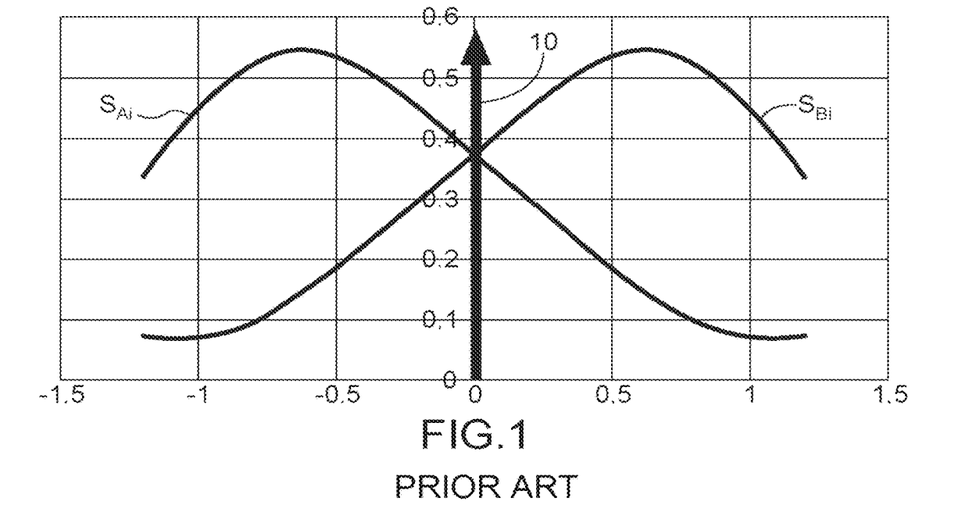
FIG. 1 schematically illustrates the spectral responses of two output channels assigned to the same sensor, in a device of the prior art.

The idea underlying the invention consists in realising that, in the prior art as described in the introduction, the relevant signal for the measurement of a spectral shift is located in a spectral region for which the collection of light is not very efficient. This observation is illustrated by FIG. 1 which shows the respective spectral responses $S_{Ai}$, $S_{Bi}$ of the output channels $A_i$ i and $B_i$ mentioned in the introduction. The x-axis is a wavelength difference, in nm, relative to the nominal wavelength $\lambda_{0i}$ of a sensor i (one of the reflectors inscribed in the optical fibre, in the example presented in the introduction). The nominal wavelength $\lambda_{0i}$ is represented by the arrow 10. The y-axis is a luminous intensity in arbitrary units. In operation, the signal returned by the sensor i is at the nominal wavelength $\lambda_{0i}$ (absence of external disturbance on the sensor i) or at a wavelength close to $\lambda_{0i}$ (presence of an external disturbance on the sensor i). This signal is thus located in a low amplitude region of the spectral response for each of the two channels $A_i$ and $B_i$.

The inventors have therefore had the idea of providing a device having output channels with flattened spectral responses, in comparison with the output channels in the devices of the prior art. The signal returned by the sensor i is located in a region in which the output channels according to the invention, associated with this sensor, each have a large amplitude spectral response. The signal-to-noise ratio is thus improved for the measurement of a spectral shift of the signal returned by the sensor i.

These flattened spectral responses are obtained by inserting a respective multimode interference coupler between an output region of the arrayed-waveguide-grating demultiplexer and two respective output waveguides. A multimode interference coupler and a pair of output waveguides correspond to each sensor i, the pair of output waveguides forming two output channels according to the invention associated with the sensor i. The redistribution of energy carried out by the multimode interference coupler distributes the energy of the signal originating from the sensor i to these two output channels, the spectral responses of which are flattened in comparison with the prior art.

In operation, the signal-distributing device receives an input light signal originating from a set of one or more sensors. Said input light signal consists of a sum of a plurality of individual response signals $\sigma_i(t)$, each returned by a respective sensor i. These signals $\sigma_i(t)$ are separated from one another by the arrayed-waveguide-grating demultiplexer, so that finally each receiving module receives one signal $\sigma_i(t)$ originating from a respective sensor i. In the absence of external disturbance on the sensor i, the signal spectrum $\sigma_i(t)$ is centred on a nominal wavelength $\lambda_{0i}$ of said sensor. In the presence of an external disturbance on the sensor i, the signal spectrum $\sigma_i(t)$ is centred on a wavelength $\lambda_i(t)$ that is slightly shifted relative to $\lambda_{0i}$. In each receiving module, the multimode interference coupler distributes this signal $\sigma_i(t)$ to the two output waveguides, each forming two output channels associated with the sensor i in the device according to the invention. One of these output channels has a spectral response centred on a wavelength $\lambda_{inf\_i}$ that is less than $\lambda_{0i}$, where $\lambda_{0i}$ is the nominal wavelength of the sensor i. The other of these output channels has a spectral response centred on a wavelength $\lambda_{sup\_i}$ that is greater than $\lambda_{0i}$. The spectral responses of these two output channels each exhibit a shape that is more spread out in comparison with the spectral responses of output channels in the prior art. Each of these two output channels can thus collect more signal at the signal wavelength $\sigma_i(t)$, in comparison with the prior art, the signal wavelength $\sigma_i(t)$ being between $\lambda_{inf\_i}$ and $\lambda_{sup\_i}$. The wavelength shift of the signal returned by the sensor i is calculated from the signals measured on each of these two output channels. Thus, the flattened spectral responses of these two output channels can improve the signal-to-noise ratio associated with the determination of this wavelength shift.

Preferably, in each receiving module, the respective ends of the two output waveguides are each located in a respective output zone of the multimode interference coupler, said output zones extending on either side of a plane of symmetry of the multimode interference coupler.

In each receiving module, said output zones can be symmetrical to each other relative to the plane of symmetry of the multimode interference coupler.

In each receiving module, said output zones are each advantageously centred on a point located at a distance less than or equal to 1500 nm relative to a central axis of said multimode interference coupler.

Preferably, the device according to the invention comprises a plurality of receiving modules disposed next to one another at the output of the arrayed-waveguide-grating demultiplexer. Advantageously, in each receiving module, respective ends of the two output waveguides are each located in a respective output zone of the multimode interference coupler, and in each receiving module, a distance between a plane of symmetry of the multimode interference coupler and the similar plane in a directly neighbouring receiving module is greater than or equal to three times the distance between the respective geometric centres of said output zones.

The invention also covers a system for measuring a wavelength shift, which comprises a signal-distributing device according to the invention and at least one pair of photodetectors, each pair of photodetectors being associated with a respective receiving module of the signal-distributing device according to the invention, and each photodetector of said pair being configured to receive a signal originating respectively from one of the two output waveguides of the corresponding receiving module.

Advantageously, said system further comprises a computer configured to receive, as input, measurement signals supplied by at least one pair of photodetectors, and to supply, as output, for each receiving module of the signal-distributing device, a measurement of a wavelength shift.

Preferably, for each pair of photodetectors, the computer is configured to calculate a ratio:

$$\frac{(\alpha'_i - \beta'_i)}{(\alpha'_i + \beta'_i)}$$

wherein $\alpha'_i$ designates the signal supplied by one of the photodetectors of said pair, and $\beta'_i$ designates the signal supplied by the other of the photodetectors of said pair.

The system according to the invention can further comprise at least one sensor optically coupled to the signal-distributing device, each sensor being configured to translate a parameter to be measured into a wavelength shift on a signal returned by said sensor, relative to a nominal wavelength of said sensor.

A respective receiving module of the signal-distributing device can correspond to each sensor, and in each receiving module the two output waveguides can be configured to receive respective signals each centred on a respective wavelength, wherein said respective wavelengths frame the nominal wavelength of said sensor.

Advantageously, the system according to the invention further comprises an optical fibre within which a plurality of Bragg grating reflectors are inscribed, each forming a respective sensor optically coupled to the signal-distributing device.

BRIEF DESCRIPTION OF THE FIGURES

The present invention will be better understood on reading the description of the embodiments, given purely by way of indication and in no way limiting, by making reference to the attached drawings, in which.

DESCRIPTION OF THE EMBODIMENTS

Figure 2A:
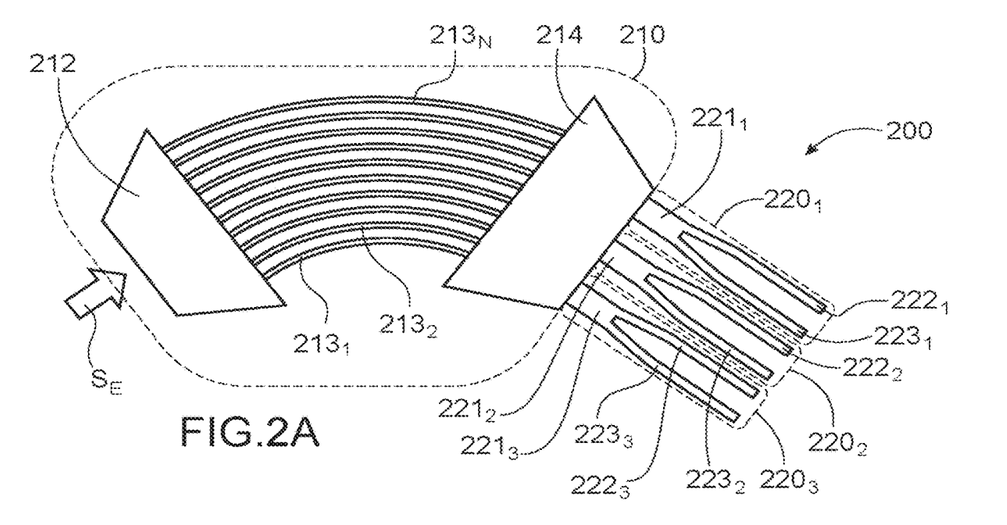
FIG. 2A schematically illustrates a first embodiment of a signal-distributing device according to the invention.

FIG. 2A schematically illustrates a first embodiment of a signal-distributing device 200 according to the invention.

The device 200 is configured here to receive as input a polychromatic light signal $S_E$ originating from a set of three sensors (not shown). Each of these sensors is configured to receive an interrogation light signal and to return, in response, a response signal centred on a respective wavelength, $\lambda_1(t)$, $\lambda_2(t)$ and $\lambda_3(t)$ respectively. In the absence of external disturbance on the sensor, said signal is centred on its nominal wavelength $\lambda_{01}$, $\lambda_{02}$ and $\lambda_{03}$ respectively. In the presence of an external disturbance on the sensor, said response signal is centred on a wavelength that is slightly shifted relative to its respective nominal wavelength.

The device 200 comprises an arrayed-waveguide-grating demultiplexer 210 and a plurality of receiving modules $220_1$, $220_2$, $220_3$, each assigned to one of the sensors i mentioned above, where i=1, 2 or 3.

Hereinafter, the arrayed-waveguide-grating demultiplexer 210 is simply referred to as "AWG" for "Arrayed Waveguide Grating". It concerns a device comprising an arrayed waveguide grating $213_1$, $213_2$ . . . $213_N$, disposed between two planar guide elements, 212 and 214 respectively. One of the planar guide elements, 212, is configured to receive, as input, a polychromatic light signal $S_E$ and to spatially spread this signal so as to distribute it as input to each of the waveguides of the arrayed waveguide grating. Each waveguide of the arrayed waveguide grating receives a signal of the same spectrum. The waveguides of the arrayed waveguide grating have lengths respectively increasing, from one end waveguide $213_1$ to an opposite end waveguide $213_N$. Preferably, the length difference in the optical path between two neighbouring waveguides is equal to an integer multiple of a central operating wavelength of the AWG. The light rays emerging from the waveguides of the arrayed waveguide grating then propagate in the second planar guide element 214. At the output of this planar guide element 214, they recombine in positions which depend on their wavelength. The AWG 210 thus produces a spatial spreading of the different spectral contributions of the polychromatic light signal $S_E$ injected as input. Preferably, the position of a light radiation at the output of the AWG is an almost linear function of its wavelength. The AWG 210 will not be further described here, because it is a device that is known in the prior art.

In this case the AWG 210 is configured to produce a chromatic dispersion over a wavelength range including at least the nominal wavelengths of the various sensors which together supply the input light signal that the device according to the invention is configured to process.

Each receiving module $220_i$ (with i=1 or 2 or 3) includes a multimode interference coupler $221_i$ and two output waveguides $222_i$, $223_i$.

The multimode interference coupler $221_i$ is an optical coupler with X input channels and Y output channels, consisting of a multimode waveguide section capable of reproducing, at periodic intervals, the energy profile of an input electromagnetic field. Such a coupler is usually called an MMI coupler, where MMI is the acronym for "Multi-Mode Interference". It is a device that is well known in the prior art. According to the invention, the MMI coupler $221_i$ is a 1×2 coupler, in other words a coupler with one input channel and two output channels. It preferably has a rectangular parallelepiped shape, with an input face disposed opposite an output face of the planar guide element 214, on the side opposite the arrayed waveguide grating. In this case, said input face of the MMI $221_i$ is attached against the planar guide element 214.

The MMI coupler $221_i$ is configured to receive, as input, a part of the wavelength-demultiplexed signal supplied by the AWG 210. In particular, the MMI coupler $221_i$ is configured to receive, as input, the response light signal returned by the sensor i. For this, the input face of said MMI $221_i$ is centred on a position, as output of the AWG 210, which in operation receives the light rays at the nominal wavelength $\lambda_{0i}$ of the sensor i. In order to be able to collect all of the response light signal returned by the sensor i, even when this sensor i returns a signal that is slightly shifted in wavelength relative to its nominal wavelength, the input face of the MMI coupler $221_i$ preferably has a width greater than or equal to $\lambda_{0i}/2$ (dimensions along the wavelength spreading axis, at the output of the AWG). For example, this width is preferably greater than 1 μm. This width can be between $\lambda_{0i}/2$ and $10*\lambda_{0i}$, which allows the response light signal returned by the sensor i to be continuously received when this signal is shifted in wavelength by an external disturbance on said sensor, without receiving signals returned by sensors other than the sensor i. For example, this width can be between 1 μm and 10 μm.

The MMI coupler $221_i$ is configured to distribute the light that it receives as input, to the output waveguides $222_i$, $223_i$. In other words, the MMI coupler $221_i$ is configured to produce an optical coupling between the output zone of the AWG which receives the signal originating from the sensor i, and the output waveguides $222_i$, $223_i$. These output waveguides $222_i$, $223_i$ are preferably single-mode waveguides. In this case, they each have an end directly attached against an MMI coupler $221_i$ output face. The MMI coupler $221_i$ is thus located inserted between the AWG 210 and the output waveguides $222_i$, $223_i$, with an edge directly attached to the planar guide element 214 and another edge directly attached to the respective ends of the output waveguides $222_i$, $223_i$.

Figure 2B:
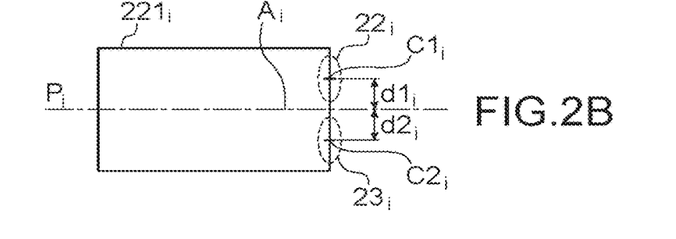
FIG. 2B schematically illustrates a detail of FIG. 2A.

FIG. 2B illustrates an MMI coupler $221_i$ of the signal-distributing device 200. In this MMI coupler $221_i$ a plane of symmetry $P_i$ is defined, substantially parallel to the direction of propagation of the light in said coupler and orthogonal to a wavelength spreading plane at the output of the AWG 210. Also defined in this MMI coupler $221_i$ are two output zones, $22_i$ and $23_i$ respectively, against which the respective ends of the output waveguides, $222_i$ and $223_i$ respectively, are attached. Each output zone, $22_i$ and $23_i$ respectively, corresponds to the projection of the MMI-side end of the output waveguide, $222_i$ and $223_i$ respectively.

The output zones, $22_i$ and $23_i$ respectively, each extend on one respective side of the plane of symmetry $P_i$. In other words, the MMI coupler $221_i$ has its two output channels located on either side of the plane of symmetry $P_i$. The position of the plane of symmetry $P_i$ advantageously corresponds to the nominal wavelength $\lambda_{0i}$ of the sensor i associated with the MMI coupler $221_i$. The output waveguides $222_i$, $223_i$, are thus configured to each receive a signal centred on a respective wavelength, said respective wavelengths framing this nominal wavelength $\lambda_{0i}$.

Optionally but advantageously, the output zones, $22_i$ and $23_i$ respectively, are substantially symmetric to each other relative to the plane of symmetry $P_i$. In other words, the MMI coupler $221_i$ has its two output channels substantially symmetric to each other relative to the plane of symmetry $P_i$. Herein, substantially symmetric means in particular that the distance between the geometric centre of the output zone $22_i$ and the plane of symmetry $P_i$ is equal to the distance between the geometric centre of the output zone $23_i$ and the plane of symmetry $P_i$, to within approximately plus or minus 20%, and even to within approximately plus or minus 10%, or even to within approximately plus or minus 5%. The position of the plane of symmetry $P_i$ advantageously corresponds to the nominal wavelength $\lambda_{0i}$ of the sensor i associated with the MMI coupler $221_i$. The output waveguides $222_i$, $223_i$ are thus configured to each receive a signal centred on a respective wavelength, where the average of these two respective wavelengths is equal to said nominal wavelength $\lambda_{0i}$.

Advantageously, the output zones, $22_i$ and $23_i$ respectively, each extend respectively on one side of the plane of symmetry $P_i$, with their respective geometric centres $C1_i$, $C2_i$ very close to one another. For example, the distance $d1_i$ and respectively $d2_i$, between the geometric centre $C1_i$ and respectively $C2_i$, and a central axis $A_i$ of the MMI coupler $221_i$, is less than or equal to 2 µm, even less than or equal to 1.5 µm and even less than or equal to 1 µm. The position of the plane of symmetry $P_i$ advantageously corresponds to the nominal wavelength $\lambda_{0i}$ of the sensor i associated with the MMI coupler $221_i$. The output waveguides $222_i$, $223_i$ are thus configured to each receive a signal centred on a respective wavelength that is very close to said nominal wavelength $\lambda_{0i}$.

The various receiving modules $220_i$ of the signal-distributing device 200 are identical with each other, except for their position along the planar guide element 214.

In each of the receiving modules $220_i$, the output waveguides, $222_i$ and $223_i$ respectively, together define two output channels of the device according to the invention, assigned to the same sensor i.

Figure 3:
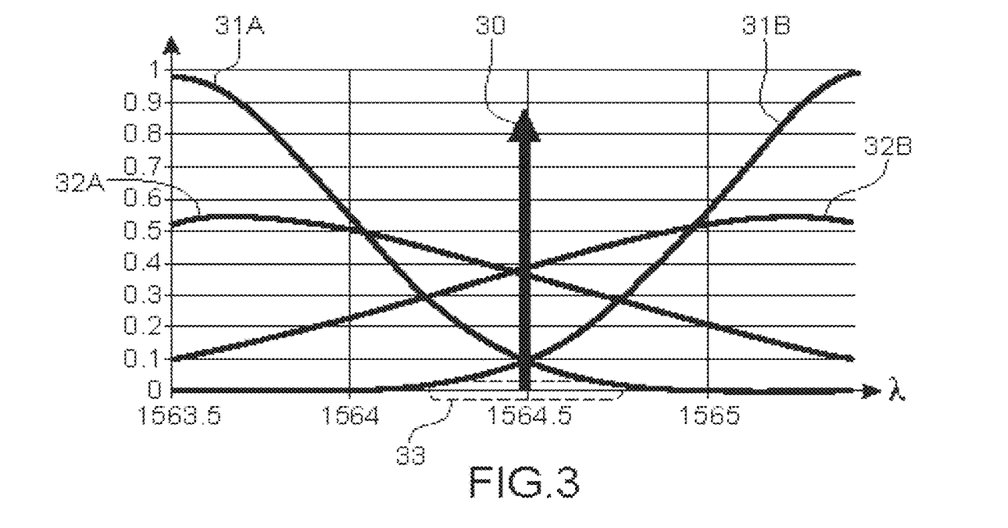
FIG. 3 illustrates a comparison of the spectral responses of two output channels assigned to the same sensor, in a device of the prior art and in a device according to the invention.

FIG. 3 illustrates the respective spectral responses of the two output channels assigned to the same sensor, in a device of the prior art and in a device according to the invention. The x-axis is a wavelength $\lambda$, in nm. The y-axis is a transmission rate, between zero and unity.

In the prior art, these two output channels each extend directly as output of the AWG. The curves 31A and 31B illustrate the spectral responses of such output channels.

In the invention, these two output channels correspond to the two output waveguides coupled to a same MMI coupler. The curves 32A and 32B illustrate the spectral responses of these two output channels. The spectral responses each have a more flattened profile in comparison with the prior art.

The arrow 30 represents the nominal wavelength $\lambda_{0i}$ of the sensor i. When the sensor i is disturbed by the appearance of a defect in its surrounding environment, it returns a signal at a wavelength slightly shifted relative to $\lambda_{0i}$, but always close to $\lambda_{0i}$. The signal returned by the sensor i is therefore most often located in a narrow spectral range 33 framing the wavelength $\lambda_{0i}$. The width of the spectral range 33 is, for example, approximately 1 nm. In this spectral range, the spectral responses of the two output channels assigned to the sensor i are of greater amplitude in the invention than in the prior art. A signal of larger amplitude is therefore measured on each of these two output channels, which allows a better signal-to-noise ratio to be obtained for the measurement of a wavelength shift, in comparison with the prior art.

According to the invention, it is therefore necessary for each sensor i, that the light signal returned by said sensor is in a useful respective range of each of the two output channels associated therewith. More particularly, it is necessary that the central wavelength of the signal returned by the sensor i remains on a flank of the respective spectral responses of each of these two output channels (away from the peak, for each of the spectral responses). Ideally, and in particular due to variations in the ambient temperature to which the sensor i may be subjected, the spectral width of said useful ranges is between 1 nm and 2 nm (where for each output channel associated with said sensor, the corresponding useful range extends on one flank of the spectral response of the output channel, at a distance from the peak). It is observed that, by contrast, the variations in wavelength measured using the device according to the invention are much smaller, being several pm to several fractions of a pm (where 1 pm=$10^{-12}$ m).

The AWG of the device according to the invention is preferably configured to provide output channels that are very close to one another, directly at the output, and each MMI, coupler associated with a sensor i is configured to receive, as input, a signal corresponding to the signal supplied on two neighbouring output channels among these output channels of the AWG. The great physical proximity between the two output channels of the AWG coupled to a same MMI, coupler corresponds to a small wavelength shift of their respective spectral responses. Said spectral responses are preferably each centred on respective central values that are very close to one another and very close to the nominal wavelength $\lambda_{0i}$ of the sensor i. This allows a lot of signals to enter the MMI, coupler associated with the sensor i, and to again improve the signal-to-noise ratio associated with the wavelength shift measurement. For example, in each pair of two neighbouring output channels of the AWG, said neighbouring output channels have their respective spectral responses spaced apart by a spectral distance between 0.01 nm and 10 nm, more preferably between 1 and 2 nm.

Two neighbouring output channels of the AWG, coupled to an MMI in the device according to the invention, are preferably spaced apart in pairs by two output channels of the AWG that are not coupled to an MMI.

Figure 4A:
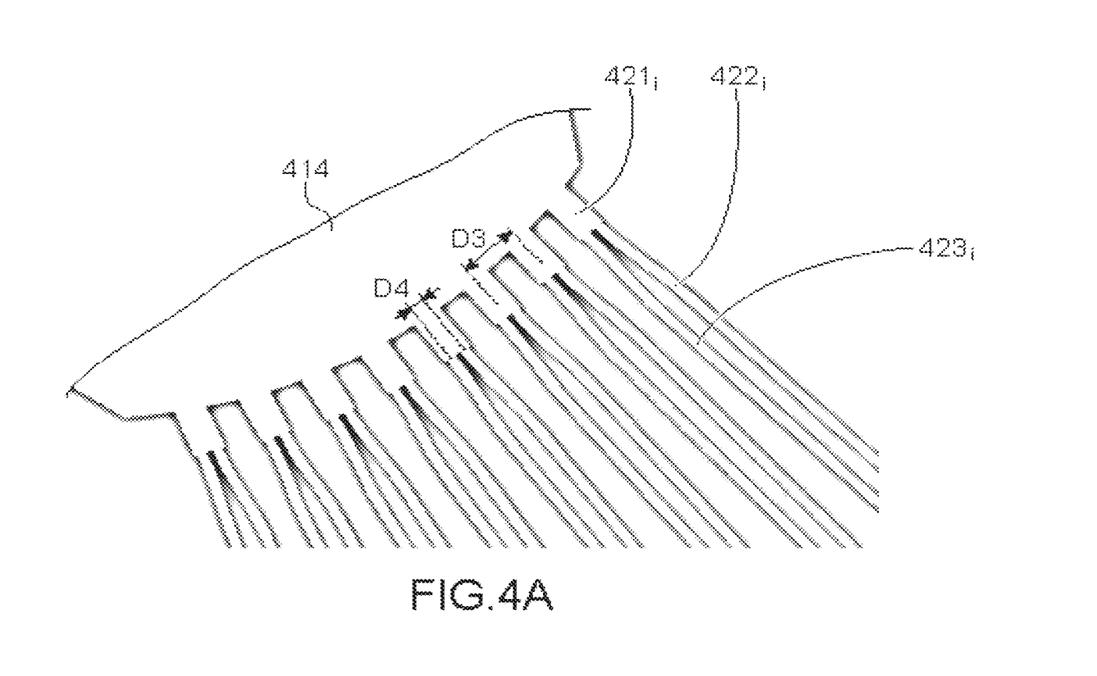
FIG. 4A illustrates a detail view of a second embodiment of a signal-distributing device according to the invention.

Such an embodiment of a device according to the invention is illustrated in FIG. 4A. FIG. 4A illustrates a detail view of a second embodiment of a signal-distributing device according to the invention. FIG. 4A shows, in particular, a part of the planar guide element 414 belonging to the AWG, as well as a plurality of couplers MMI $421_i$ attached against an edge of said planar guide element 414, and for each MMI coupler $421_i$ a pair of two output waveguides $422_i$, $423_i$.

A distance D3 is defined, which corresponds to the distribution pitch of the MMI $421_i$ in the device according to the invention. D3 corresponds to the distance between the respective planes of symmetry of two neighbouring MMI couplers in the device according to the invention.

A distance D4 is also defined, which correspond to the distance, in each MMI coupler $421_i$, between the geometric centres of the two output channels of said coupler. In other words, D4 corresponds to the distance between the respective geometric centres of two output zones of said coupler, where each output zone corresponds to the surface of the coupler covered by the end of one of the output waveguides.

Figure 4B:
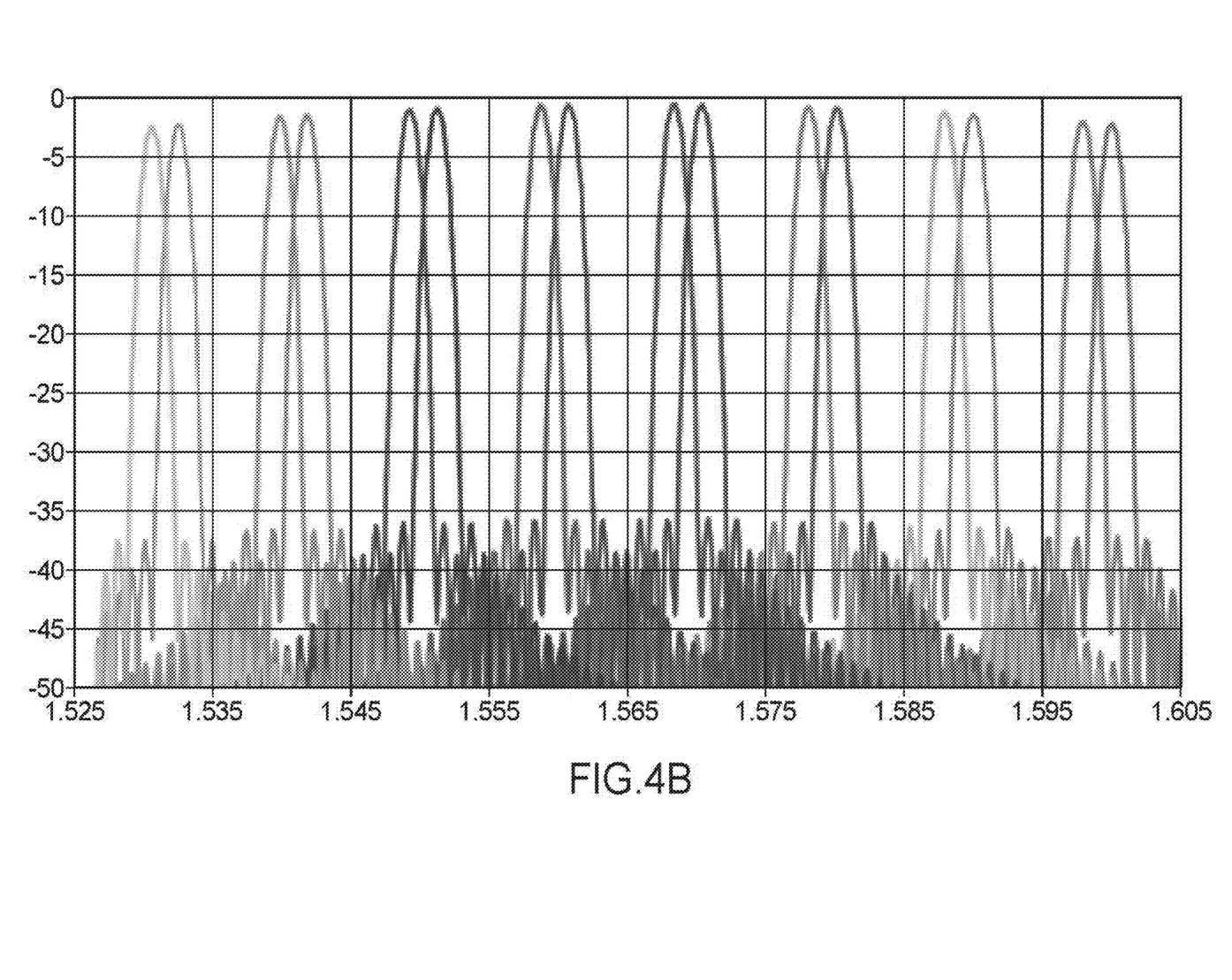
FIG. 4B illustrates the spectral response of output channels defined at the output of the AWG shown in FIG. 4A.

In this case, the AWG is configured to offer a maximum of 32 very close output channels, these output channels being directly defined at the output of the AWG. Among these 32 channels, 8 pairs have been selected. FIG. 4B illustrates the spectral responses of said 8 selected pairs. The 8 selected pairs are separated, in pairs, by an unselected pair. Each MMI coupler $421_i$ is configured to receive, as input, a signal corresponding to the signal on one of these 8 selected pairs. Consequently, the distance D3 is equal to 4 times the distance D4.

In any event, the distance D3 is preferably greater than the distance D4, with a ratio strictly greater than 2, and even strictly greater than 3 between these two distances.

According to the invention, the measurement $M'_i$ of a wavelength shift returned by a sensor i to the signal-distributing device, is given by:

$$M'_i = \frac{(\alpha'_i - \beta'_i)}{(\alpha'_i + \beta'_i)} \quad (2)$$

with $\alpha'_i$ the signal measured on an output channel $A'_i$ and $\beta'_i$ the signal measured on output channel $B'_i$ of the device according to the invention, where $A'_i$ and $B'_i$ are two output channels of the device according to the invention assigned to the sensor i. These output channels correspond to the two output waveguides of the receiving module assigned to the sensor i.

Similarly, in the prior art, the measurement $M_i$ of a shift in wavelength returned by a sensor i to a device as described in the introduction, is given by:

$$M_i = \frac{(\alpha_i - \beta_i)}{(\alpha_i + \beta_i)} \quad (3)$$

with $\alpha_i$ the signal measured on an output channel $A_i$ and $\beta_i$ the signal measured on an output channel $B_i$, where $A_i$ and $B_i$ are two output channels of the AWG assigned to the sensor i.

Figure 5A:
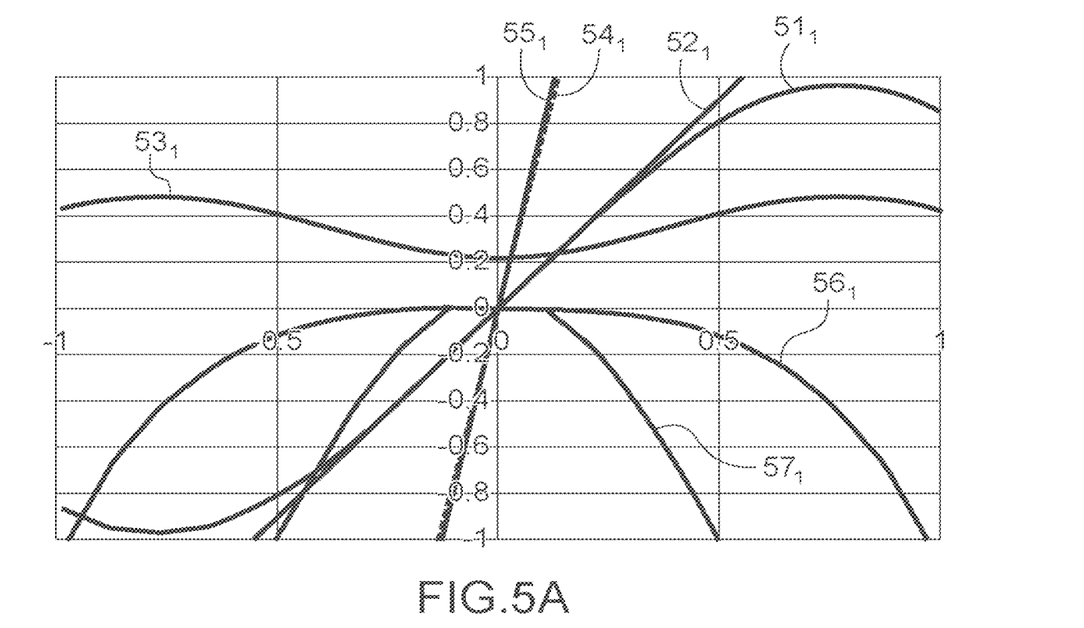
FIG. 5A illustrates various combinations of spectral responses of two output channels assigned to the same sensor, in a device of the prior art.

FIG. 5A illustrates various combinations of spectral responses $S_{Ai}$, $S_{Bi}$ of the two output channels $A_i$, $B_i$, in a device of the prior art as described in the introduction. The X axis is a difference in wavelength with respect to the nominal wavelength $\lambda_{0i}$ of the sensor i. The y-axis is a transmission rate, between zero and unity, or a quantity without units.

The curve $51_1$ illustrates the signal $S1=S_{Ai}-S_{Bi}$.

The straight line $52_1$ corresponds to the straight line closest to the curve $51_1$, tangent to the curve $51_1$ in $\lambda=\lambda_{0i}$.

The curve $53_1$ illustrates the signal $S2=S_{Ai}+S_{Bi}$.

The curve $54_1$ illustrates the signal S1/S2, corresponding to the measurement M in the prior art, of the wavelength shift on a signal returned by a sensor i.

The straight line $55_1$ is the straight line closest to the curve $54_1$.

The curve $56_1$ illustrates the deviation of the curve $51_1$ (signal S1) relative to the straight line $52_1$. The curve $56_1$ thus illustrates the linearity of the signal S1.

The curve $57_1$ illustrates the deviation of the curve $54_1$ (signal S1/S2) relative to the straight line $55_1$. The curve $57_1$ thus illustrates the linearity, in the prior art, of the measurement $M_i$ of the wavelength shift on a signal returned by a sensor i.

Figure 5B:
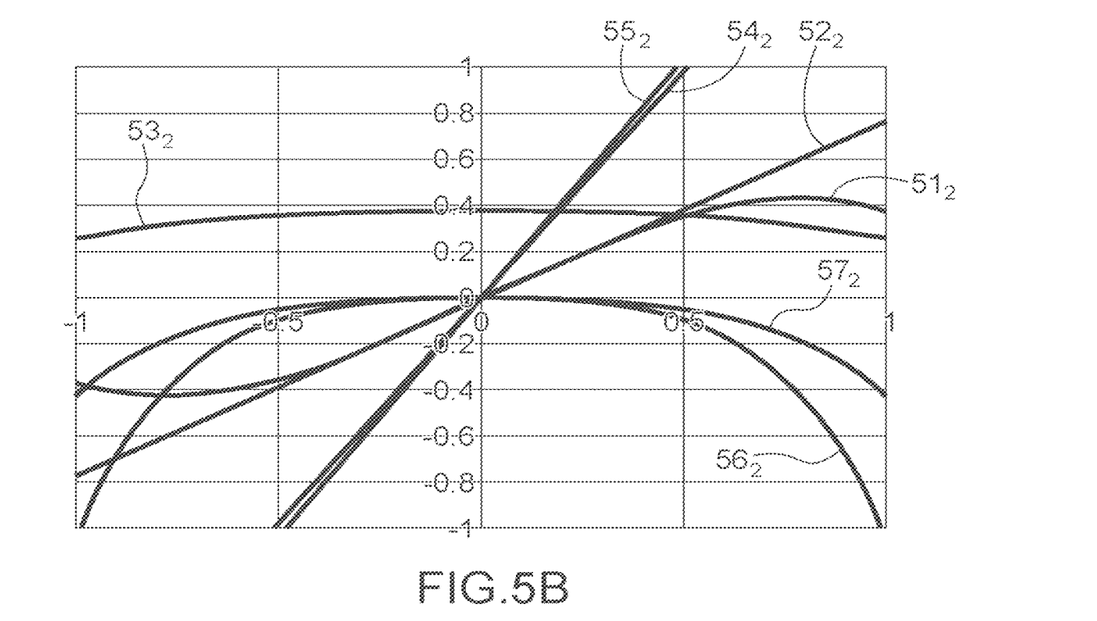
FIG. 5B illustrates various combinations of spectral responses of two output channels assigned to the same sensor, in a device according to the invention.

FIG. 5B illustrates the corresponding signals in the case of a signal-distributing device according to the invention. FIG. 5B thus illustrates various combinations of spectral responses $S'_{Ai}$, $S'_{Bi}$ of the two output channels $A'_i$, $B'_i$. Here again, the X axis is a difference in wavelength with respect to the nominal wavelength $\lambda_{0i}$ of the sensor i. The y-axis is a transmission rate, between zero and unity, or a quantity without units.

The curve $51_2$ illustrates the signal $S1'=S'_{Ai}-S'_{Bi}$.

The straight line $52_2$ corresponds to the straight line closest to the curve $51_2$, tangent to the curve $51_2$ in $\lambda=\lambda_{0i}$.

The curve $53_2$ illustrates the signal $S2'=S'_{Ai}+S'_{Bi}$.

The curve $54_2$ illustrates the signal S1'/S2', corresponding to the measurement $M'_i$ of the wavelength shift on a signal returned by a sensor i, in a device according to the invention.

The straight line $55_2$ corresponds to the straight line closest to the curve $54_2$, tangent to the curve $54_2$ in $\lambda=\lambda_{0i}$.

The curve $56_2$ illustrates the deviation of the curve $51_2$ (signal S1') relative to the straight line $52_2$. The curve $56_2$ thus illustrates the linearity of the signal Sr.

The curve $57_2$ illustrates a deviation of the curve $54_2$ (signal S1'/S2') relative to the straight line $55_2$. The curve $57_2$ thus illustrates the linearity of the measurement $M'_i$ of the wavelength shift on a signal returned by a sensor i, in a device according to the invention.

The comparison of FIGS. 5A and 5B highlights several advantages provided by the device according to the invention.

In particular, the comparison of the curve $53_1$ of FIG. 5A with curve $53_2$ of FIG. 5B shows that the invention increases the quantity of signal collected at the nominal wavelength $\lambda_{0i}$ of the sensor i and around this wavelength. The signal-to-noise ratio, which depends on the quantity of signal collected, is therefore increased.

In addition, the comparison of curve $57_1$ of FIG. 5A with curve $57_2$ of FIG. 5B shows that due to a better recovery of light, the invention increases the linear range of the measurement of a wavelength shift of a signal returned by a sensor i.

This linear range is increased in comparison with a device according to the prior art, the AWG of which has the same characteristics. Alternatively, a more dispersive AWG than in the prior art can be used in the invention, and contains a linear range at least as broad as in the prior art. The AWG being more dispersive, it is more sensitive to any variation in the wavelength of the signal returned by the sensor i. A device can also be obtained that provides a greater sensitivity of the measurement of a wavelength shift, over an at least identical spectral range.

In addition or alternatively, this broader linear range can be used to increase a range of measurable wavelengths, enabling, for example, shifts of larger amplitude to be measured.

Various examples of a system including a signal-distributing device according to the invention are then illustrated.

Figure 6A:
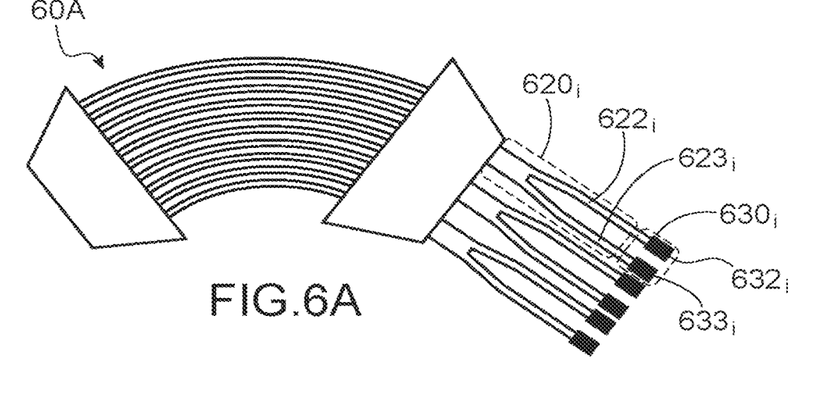
FIG. 6A schematically illustrates a first embodiment of a system according to the invention, comprising the device of FIG. 2A.

FIG. 6A schematically illustrates a first embodiment of such a system 60A, comprising a signal-distributing device as described with reference to FIGS. 2A and 2B, and, for each receiving module $620_i$ of said device, a pair $630_i$ of photodetectors $632_i$, $633_i$. Thus, each receiving module $620_i$ is associated with a pair $630_i$ of photodetectors, wherein a first photodetector $632_i$ receives a signal from a first output waveguide $622_i$ of said module and a second photodetector $633_i$ receives a signal from a second output waveguide $623_i$ of said module.

The various pairs $630_i$ of photodetectors can correspond to the photodetectors of a same strip of photodetectors, directly attached at the output of a chip on which the signal-distributing device is embodied. Alternatively, the photodetectors can be discreet photodetectors, each connected to a chip on which the signal-distributing device is embodied by a respective optical fibre.

Figure 6B:
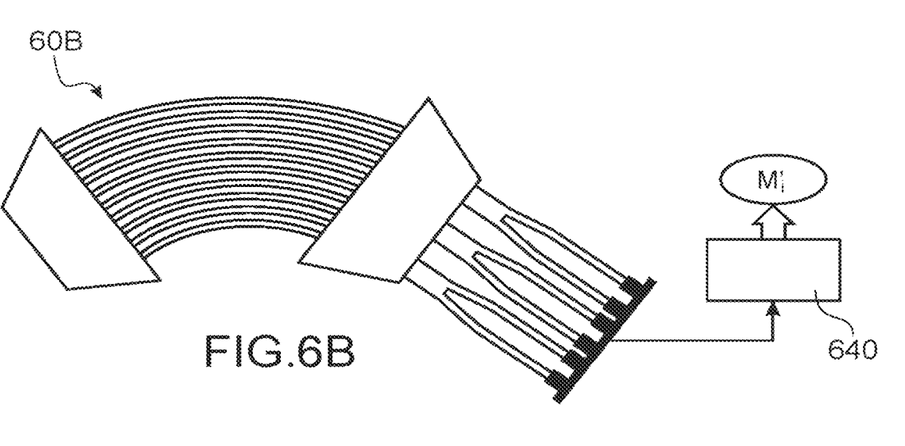
FIG. 6B schematically illustrates a second embodiment of a system according to the invention, comprising the device of FIG. 2A.

FIG. 6B schematically illustrates a second embodiment of a system 60B, which only differs from the system of FIG. 6A in that it further includes a computer 640, or processor, connected to said photodetectors and configured to receive, as input, respective measurement signals supplied by each of these detectors. The computer is configured to process these various signals so as to determine, for each pair of photodetectors, a measurement $M'_i$ of a wavelength shift. Said measurement is determined by implementing the calculations defined above, in particular in equation (2).

Figure 6C:
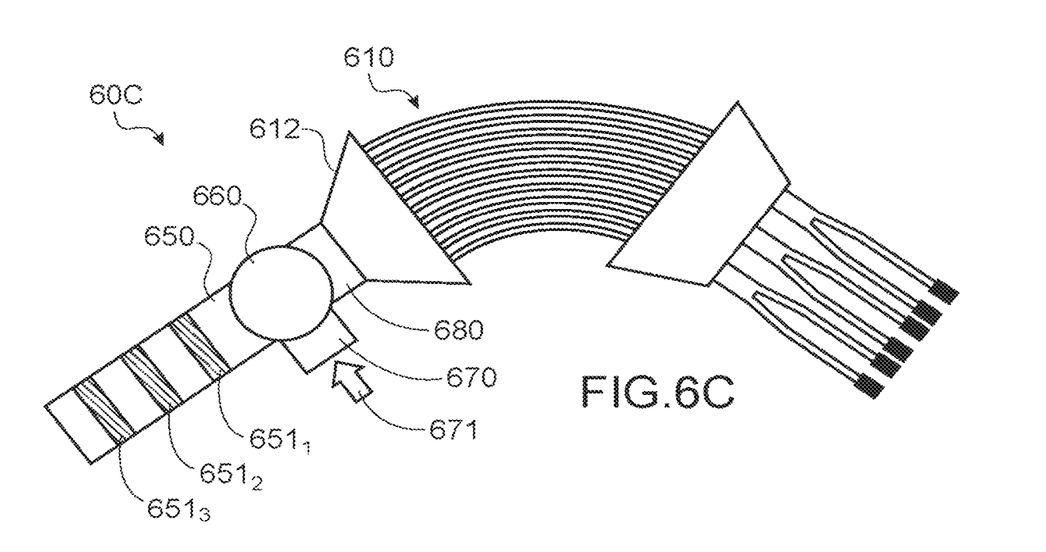
FIG. 6C schematically illustrates a third embodiment of a system according to the invention, comprising the device of FIG. 2A.

FIG. 6C schematically illustrates a second embodiment of a system 60C, which only differs from the system of FIG. 6A in that it includes an optical fibre 650, one end of which is optically coupled to the input of the AWG 610, in this case by means of an optical circulator 660. A plurality of Bragg grating reflectors $651_1$, $651_2$, $651_3$ are inscribed in the optical fibre 650.

The optical circulator 660 is coupled to three circulation channels formed respectively by the optical fibre 650, an injection fibre 670 configured to transport a polychromatic light signal 671, and a section of waveguide 680 extending between the optical circulator 660 and the input of the device according to the invention (at one edge of the planar guide element 612, on the side opposite the arrayed waveguide grating in the AWG 610). The optical circulator 660 is configured to transmit, to the optical fibre 650, the polychromatic light signal 671 arriving at the injection fibre 670, and to transmit, to the section of waveguide 680 as input of the device according to the invention, a light signal returned by the optical fibre 650.

The reflectors $651_1$, $651_2$, $651_3$ each form a respective sensor, each having a respective nominal wavelength, $\lambda_{01}$, $\lambda_{02}$ and $\lambda_{03}$ respectively. The reflected light signal returned by the optical fibre 650, corresponds to the sum of the individual signals returned simultaneously by each of said reflectors. In the signal-distributing device, each receiving module is associated with one of the reflectors, $651_1$, $651_2$ and $651_3$ respectively. According to an alternative which is not shown, the system of FIG. 6C further includes a computer as described with reference to FIG. 6B.

According to yet more alternatives, the system according to the invention includes a broad-spectrum light source configured to supply a polychromatic light signal as input for an array of sensors (for example as input of the optical fibre 650 provided with reflectors $651_1$, $651_2$, $651_3$ as described above). The sensors are configured to each receive at least a part of this polychromatic light signal emitted by the broad-spectrum light source, and to supply, in response, a response signal which is guided to the input of the device according to the invention. The broad-spectrum light source is, for example, a superluminescent diode. The spectral power density thereof has a width at half height greater than or equal to 50 nm and even more.

Advantageously, the device and the system according to the invention are each configured to process signals at standard wavelengths for the field of telecommunications, between 1500 nm and 1600 nm. This allows common commercially available components to be used.

For example, an AWG of dimensions 5 mm by 4 mm is used, comprising an array of 121 waveguides, and designed for a maximum of 32 very close output channels, among which 8 pairs of channels are used. Such an AWG is configured to provide a chromatic dispersion defined by approximately 1 µm of lateral displacement in an output focal plane per nanometre of wavelength shift around 1500 nm.

Each MMI has, for example, a length of 6.65 µm (dimension in the direction of propagation of the light in the MMI) for a width of 3.6 µm (dimension along the axis of chromatic dispersion by the AWG). The output waveguides, at the output of the MMI, each have, for example a width of 800 nm. They each have their centre spaced apart by 1 µm relative to a central axis of the MMI, at their respective ends attached to the MMI.

The output waveguides are preferably silicon nitride guides with rectangular cross-section, embedded in silica. These are preferably single-mode guides around 1500 nm, with a cross-section of dimension between 400 nm and 900 nm, for example 800 nm wide by 500 nm high, or a square cross-section of 600 nm by 600 nm. Such output waveguides are produced, for example, from a silicon substrate, on which a layer of silica is deposited and then a layer of silicon nitride ($Si_3N_4$) is deposited by plasma-enhanced chemical vapour deposition or low-pressure chemical vapour deposition. A layer of silica can also be deposited on the rear face of the substrate, in order to limit its mechanical deformations. The silicon nitride layer is then etched by lithography and reactive ion etching, in order to define therein the output waveguides according to the invention. Then, these waveguides are covered again with a new layer of silica.

Simulations of a device according to the invention having these characteristics show that it allows collection of twice the amount of light, for each sensor i and in comparison with the prior art in which the pairs of output waveguides are disposed directly at the output of the AWG.

The invention is particularly advantageously applied to multipoint surveillance of mechanical structures, applied to fields such as aeronautics, land transport and maritime transport. One or more optical fibres are preferably disposed within the mechanical structure to be monitored, with Bragg grating reflectors inscribed in each of these optical fibres. In each optical fibre, the reflectors have, at rest, a respective reflection wavelength termed the nominal wavelength. The appearance of a mechanical defect in the structure generates a modification in the reflection wavelength of one or more reflectors (linked for example to a modification in the index or periodicity in the Bragg grating reflector). In use, a polychromatic signal is injected as input to the optical fibre, the spectrum of which covers the respective nominal wavelengths of each of the respective reflectors inscribed in said fibre. In response, the optical fibre returns a reflected signal which is the sum of individual signals reflected by each of the reflectors. The device according to the invention can produce, from this reflected signal, a simultaneous measurement of a plurality of wavelength shifts associated with each of the reflectors (the shift measured can be zero, in particular in the absence of a defect in the structure in the vicinity of the corresponding reflector).

If necessary, the Bragg grating reflectors inscribed in the optical fibre can form acoustic receivers. In this case, ultrasonic waves are sent into the mechanical structure, which propagate in the structure until they each reach the Bragg grating reflectors. The presence of defects in the structure modifies the characteristics of the ultrasonic wave and thus its effect on the Bragg grating reflector which receives it.

The invention is not limited to the examples described above, and numerous alternatives can be implemented without going beyond the scope of the invention.

In particular, the device according to the invention can be configured to carry out the measurement of a signal originating from a single sensor, and including only one receiving module. According to other alternatives, the device according to the invention can be configured to receive signals originating from at least one annular microresonator sensor or Fabry-Perot cavity sensor, or any other sensor forming a transducer configured to translate a value of a parameter to be measured into a wavelength shift value on an output signal.

The invention is also not limited to the dimensions and wavelengths of use mentioned above. Similarly, alternatives of the invention can be realised in which the output waveguides are not directly attached against the corresponding MMI coupler, but separated therefrom by an adapter. Similarly, alternatives of the invention can be realised in which the MMI coupler or couplers are not directly attached against the output of the AWG, but separated therefrom by an adapter, for example a spreader commonly referred to as a "taper".

It is noted that a measurement of a wavelength shift is referred to throughout the text. In each case this is a shift relative to the nominal wavelength of a sensor. In addition, it involves an indirect measurement since two signals are measured which are then combined in order to calculate a value of said wavelength shift.

It can be observed that, in the field of telecommunications, demultiplexing devices exist which are structurally rather close to the device according to the invention, with an AWG and a respective MMI coupler inserted between each output channel of the AWG and an output waveguide. Such a device is described, in particular, by P. Munoz & al., in the article "*Analysis and design of arrayed waveguide gratings with MMI couplers*", Optics Express, Vol. 9, No. 7, 24 Sep. 2001. The MMI couplers then each couple a single output channel of the AWG with a single output waveguide, and do not each have two output channels distinct from one another. In addition, the goal of such devices is to improve wavelength demultiplexing (better isolation between the output channels and flattening of the spectral response of each output channel), and not measuring the shifts in wavelength using two distinct output channels.

It can also be observed that interesting results can be obtained using a device without an MMI coupler, in which each pair of output waveguides is directly disposed at the output of the AWG, with the two output waveguides of a given pair disposed closest to one another at the output of the AWG. The two output waveguides then correspond to two output channels of the AWG, for which the respective spectral responses are slightly shifted in wavelength. Each pair of waveguides is associated with a sensor i of nominal wavelength $\lambda_{0i}$, where $\lambda_{0i}$ takes a value intermediate between the central wavelength of these two spectral responses. The small wavelength shift between these two spectral responses makes it possible to collect plenty of signal at the wavelength $\lambda_{0i}$ and around this wavelength.

The invention claimed is:

1. A signal-distributing device for measuring at least one wavelength shift, and comprising an arrayed-waveguide-grating demultiplexer configured in order to spatially separate spectral contributions of an input optical signal, and at least one receiving module, each receiving module comprising a multimode interference coupler and two output waveguides, with the multimode interference coupler having a rectangular parallelopiped shape without a taper portion and located between the arrayed-waveguide-grating demultiplexer and the output waveguides and configured to distribute, to the two output waveguides, an optical signal originating from the arrayed-waveguide-grating demultiplexer, wherein said multimode interference coupler is attached directly against the arrayed- waveguide-grating demultiplexer and the output waveguides being directly attached to the coupler.

2. The device according to claim 1, wherein in each receiving module, the respective ends of the two output waveguides are each located in a respective output zone of the multimode interference coupler, said output zones extending on either side of a plane of symmetry of the multimode interference coupler.

3. The device according to claim 2, wherein in each receiving module, said output zones are symmetrical to each other relative to the plane of symmetry of the multimode interference coupler.

4. The device according to claim 2, wherein in each receiving module, said output zones are each centred on a point located at a distance less than or equal to 1500 nm relative to a central axis of said multimode interference coupler .

5. The device according to claim 1, wherein said device comprises a plurality of receiving modules disposed next to one another at the output of the arrayed-waveguide-grating demultiplexer.

6. The device according to claim 5, wherein in each receiving module, respective ends of the two output waveguides are each located in a respective output zone of the multimode interference coupler, and wherein in each receiving module, a distance between a plane of symmetry of the multimode interference coupler and a similar plane in a directly neighbouring receiving module is greater than or equal to three times the distance between respective geometric centres of said output zones.

7. A system for measuring a wavelength shift, wherein said system comprises a signal-distributing device according to claim 1, and at least one pair of photodetectors, each pair of photodetectors being associated with a respective receiving module of the signal-distributing device, and each photodetector of said pair being configured to receive a signal originating respectively from one of the two output waveguides of the corresponding receiving module.

8. The system according to claim 7, wherein said system further comprises a computer configured to receive, as input, measurement signals supplied by at least one pair of photodetectors, and to supply as output, for each receiving module of the signal-distributing device, a measurement of a wavelength shift.

9. The system according to claim 8, wherein for each pair of photodetectors, the computer is configured to calculate a ratio:

$$\frac{(\alpha'_i - \beta'_i)}{(\alpha'_i + \beta'_i)}$$

wherein $\alpha'_i$ designates the signal supplied by one of the photodetectors of said pair, and $\beta'_i$ designates the signal supplied by the other of the photodetectors of said pair.

10. The system according to claim 7, wherein said system further comprises at least one sensor optically coupled to the signal-distributing device, each sensor being configured to translate a parameter to be measured into a wavelength shift on a signal returned by said sensor, relative to a nominal wavelength of said sensor.

11. The system according to claim 10, wherein a respective receiving module of the signal-distributing device corresponds to each sensor, and wherein in each receiving module the two output waveguides are configured to receive respective signals each centred on a respective wavelength, wherein said respective wavelengths frame the nominal wavelength of said sensor.

12. The system according to claim 10, wherein said system further comprises an optical fibre within which a plurality of Bragg grating reflectors are inscribed, which each form a respective sensor optically coupled to the signal-distributing device.

13. A system for measuring a wavelength shift, comprising:
- a signal-distributing device for measuring at least one wavelength shift, and comprising an arrayed-waveguide-grating demultiplexer configured in order to spatially separate spectral contributions of an input optical signal, and at least one receiving module, each receiving module comprising a multimode interference coupler and two output waveguides, with the multimode interference coupler located between the arrayed-waveguide-grating demultiplexer and the output waveguides and configured to distribute, to the two output waveguides, an optical signal originating from the arrayed-waveguide-grating demultiplexer, wherein said multimode interference coupler is attached directly against the arrayed-waveguide-grating demultiplexer or separated therefrom by a taper-type adapter,
- at least one pair of photodetectors, each pair of photodetectors being associated with a respective receiving module of the signal-distributing device, and each photodetector of said pair being configured to receive a signal originating respectively from one of the two output waveguides of the corresponding receiving module, and
- a computer configured to receive, as input, measurement signals supplied by at least one pair of photodetectors, and to supply as output, for each receiving module of the signal-distributing device, a measurement of a wavelength shift,
wherein for each pair of photodetectors, the computer is configured to calculate a ratio:

$$\frac{(\alpha'_i - \beta'_i)}{(\alpha'_i + \beta'_i)}$$

wherein $\alpha'_i$ designates the signal supplied by one of the photodetectors of said pair, and $\beta'_i$ designates the signal supplied by the other of the photodetectors of said pair.

14. A system for measuring a wavelength shift, comprising:
- a signal-distributing device for measuring at least one wavelength shift, and comprising an arrayed-waveguide-grating demultiplexer configured in order to spatially separate spectral contributions of an input optical signal, and at least one receiving module, each receiving module comprising a multimode interference coupler and two output waveguides, with the multimode interference coupler located between the arrayed-waveguide-grating demultiplexer and the output waveguides and configured to distribute, to the two output waveguides, an optical signal originating from the arrayed-waveguide-grating demultiplexer, wherein said multimode interference coupler is attached directly against the arrayed-waveguide-grating demultiplexer or separated therefrom by a taper-type adapter,
- at least one pair of photodetectors, each pair of photodetectors being associated with a respective receiving module of the signal-distributing device, and each photodetector of said pair being configured to receive a signal originating respectively from one of the two output waveguides of the corresponding receiving module,
- at least one sensor optically coupled to the signal-distributing device, each sensor being configured to translate a parameter to be measured into a wavelength shift on a signal returned by said sensor, relative to a nominal wavelength of said sensor, and
- an optical fibre within which a plurality of Bragg grating reflectors are inscribed, which each form a respective sensor optically coupled to the signal-distributing device.

15. The device according to claim 1, wherein
the arrayed-waveguide-grating demultiplexer has a planar guide element, and
the input face of the multimode interference coupler is attached to the planar guide element.

* * * * *